United States Patent
Khitrov et al.

(10) Patent No.: US 10,909,991 B2
(45) Date of Patent: Feb. 2, 2021

(54) SYSTEM FOR TEXT-DEPENDENT SPEAKER RECOGNITION AND METHOD THEREOF

(71) Applicant: ID R&D, Inc., New York, NY (US)

(72) Inventors: Alexey Khitrov, New York, NY (US); Konstantin Simonchik, St. Petersburg (RU)

(73) Assignee: ID R&D, INC., New York, NY (US)

( * ) Notice: Subject to any disclaimer, the term of this patent is extended or adjusted under 35 U.S.C. 154(b) by 0 days.

(21) Appl. No.: 16/393,882

(22) Filed: Apr. 24, 2019

(65) Prior Publication Data
US 2019/0325880 A1 Oct. 24, 2019

Related U.S. Application Data

(60) Provisional application No. 62/661,908, filed on Apr. 24, 2018.

(51) Int. Cl.
*G10L 17/24* (2013.01)
*G10L 17/02* (2013.01)

(52) U.S. Cl.
CPC .............. *G10L 17/24* (2013.01); *G10L 17/02* (2013.01)

(58) Field of Classification Search
USPC ..................................................... 704/1–504
See application file for complete search history.

(56) References Cited

U.S. PATENT DOCUMENTS

| | | | | |
|---|---|---|---|---|
| 8,099,288 B2* | 1/2012 | Zhang | ..................... | G10L 17/14 704/275 |
| 8,160,877 B1* | 4/2012 | Nucci | ..................... | G10L 17/06 704/246 |
| 8,412,525 B2* | 4/2013 | Mukerjee | ................ | G10L 25/93 704/254 |
| 9,208,777 B2* | 12/2015 | Yao | ........................ | G10L 15/063 |
| 10,157,272 B2* | 12/2018 | Kim | ......................... | G06F 21/46 |
| 10,476,872 B2* | 11/2019 | McLaren | ............ | H04L 63/0861 |
| 10,540,979 B2* | 1/2020 | Visser | ..................... | G10L 15/22 |
| 2004/0260550 A1* | 12/2004 | Burges | ..................... | G10L 17/00 704/259 |
| 2008/0249774 A1 | 10/2008 | Kim et al. | | |
| 2014/0214420 A1* | 7/2014 | Yao | ........................ | G10L 15/063 704/243 |
| 2016/0148012 A1* | 5/2016 | Khitrov | .................... | G06F 21/36 726/19 |
| 2017/0236520 A1* | 8/2017 | Borgstrom | .............. | G10L 17/04 704/239 |
| 2019/0325880 A1* | 10/2019 | Khitrov | .................... | G10L 17/02 |

FOREIGN PATENT DOCUMENTS

| | | |
|---|---|---|
| CN | 103077720 B | 2/2015 |
| CN | 105810199 A | 7/2016 |
| KR | 101805437 B2 | 12/2017 |

* cited by examiner

*Primary Examiner* — Marcus T Riley
(74) *Attorney, Agent, or Firm* — Finnegan, Henderson, Farabow, Garrett & Dunner LLP

(57) ABSTRACT

A computer-implemented method for verifying identity of a speaker is proposed. A low dimensional p-vector based on a speech of the speaker is extracted from the generated high dimensional speaker model and is then compared with the stored specific speaker's p-vector obtained previously during the enrollment process. The resulting biometric score is then used to determine whether to verify the speaker, or not.

20 Claims, 6 Drawing Sheets

SYSTEM FOR TEXT-DEPENDENT SPEAKER RECOGNITION AND METHOD THEREOF

TECHNICAL FIELD

The present disclosure relates generally to speaker recognition and, in particular, to text-dependent speaker recognition. More particularly, the present disclosure relates to methods for verifying identity and determining identity of a speaker and to system implementing such methods.

BACKGROUND OF THE INVENTION

This application claims priority from Provisional Application 62/661,908, filed Apr. 24, 2018, entitled "A system method and apparatus for fast and accurate text-dependent speaker recognition".

The present invention relates generally to systems and methods for speaker recognition based on voice analysis.

The field of biometrics, or the measuring of physical characteristics used to recognize identity or to verify a claimed identity of an individual, has emerged as an increasingly reliable methodology for verification (one-to-one) and identification (one-to-many) of individuals. Biometrics has become a very powerful tool in solving of problems associated with requiring positive identification of individuals.

Reducing an amount of speech required while obtaining the satisfactory performance has been the focus in a number of recent studies aimed at Joint Factor Analysis (JFA) and SVM based speaker verification. Most recent voice biometric verification systems are currently based on i-vector approach, however, this methodology requires higher computational power since i-vectors are extracted by means of factor analysis, which is a complex, multi-iterative procedure. Moreover, i-vectors perform poorly on short utterances, as their dimensions are low. Recent scientific studies have shown that GMM-MAP methodology surpasses i-vector in accuracy of voice biometric verification where an amount of data gathered for training the speaker model is relatively small.

SUMMARY OF THE INVENTION

The idea of the proposed invention is that the inventors combine strengths of both methods of i-vector and GMM-MAP in a unique way to solve a problem of the verification on short utterances. It is proposed to simulate a voice using the GMM-MAP approach, and then to transform the GMM model using a method of reducing a dimension to an average dimensional vector. After that it is proposed to utilize a channel-compensation module based on discriminant analysis. The inventors call the intermediate vector as a "p-vector".

The p-vector approach in conjunction with Gaussian Mixture Modelling or Deep Neural Networks significantly improves a time of speaker modelling and improves recognition accuracy as well. The present invention helps to reduce a cost of hardware used by commercial voice biometric systems as well as to increase its recognition effectiveness.

According to one aspect of the present invention, a computer-implemented method for verifying identity of a speaker comprises requesting the speaker who claims to be a specific speaker to repeat a predefined passphrase; continuously capturing a speech signal until the passphrase ends; extracting speech features from the speech signal; calculating a high dimensional Gaussian Mixture Model (GMM) speaker model of speech features using a Universal Background Model (UBM) as a predefined GMM; extracting a low dimensional p-vector from the GMM speaker model; comparing a stored reference p-vector previously obtained using above steps for the specific speaker and the extracted p-vector using a matching algorithm to determine a resulting biometric score; and verifying identity of the speaker on the basis of said resulting biometric score.

According to another aspect of the present invention, a computer-implemented method for determining identity of a speaker comprises requesting the speaker who claims to be a specific speaker to repeat a predefined passphrase; continuously capturing a speech signal until the passphrase ends; extracting speech features from the speech signal; calculating a high dimensional GMM speaker model of speech features using a UBM as a predefined GMM; extracting a low dimensional vector from the GMM speaker model; comparing a stored reference vector previously obtained using the above steps for the specific speaker and the extracted vector using a matching algorithm to determine a resulting biometric score; and verifying identity of the speaker on the basis of said resulting biometric score.

According to yet another aspect of the present invention, a system for recognizing identity of a speaker comprises a user interface (UI); a microphone configured to capture a speech signal from a speaker; a software programmable CPU; a memory unit configured to store at least one vector; a feature extraction module for extracting speech features from the speech signal; a GMM modelling module for calculating a high dimensional GMM speaker model of the speech features using a UBM as a predefined GMM; a vector extraction module for extracting a low dimensional vector from the GMM speaker model; and a vector matching module for comparing at least one stored vector and the extracted vector.

Some embodiments may include use of Deep Neural Network for GMM statistics estimation, while some embodiments may include use of Deep Neural Network for speech feature extraction.

The present invention allows to drastically improve CPU time and authentication accuracy for text-dependent speaker recognition task.

BRIEF DESCRIPTION OF THE DRAWINGS

While claims particularly point out and distinctly describe the present invention, it is believed the invention will be better understood from the following description with the accompanying drawings which illustrate, in a non-limiting fashion, the best mode presently contemplated for carrying out the present invention, and in which like reference numerals designate like parts throughout the drawings, wherein:

DETAILED DESCRIPTION OF THE PREFERRED EMBODIMENTS

The present disclosure will now be described with reference to the drawings in which example embodiments of the present invention are shown. The subject matter of this disclosure may, however, be embodied in many different forms and should not be construed as being limited to the embodiments set forth herein.

In the present disclosure, "recognition" of identity of a speaker relates to, without limitation, either verification of identity of a speaker, or determining of identity of a speaker. Also, a term "user", whenever used in the present disclosure, also indicates a "speaker" or an "individual".

Enrollment stage, or enrollment process, is an initial part of the methods according to the present invention.

Figure 1A:
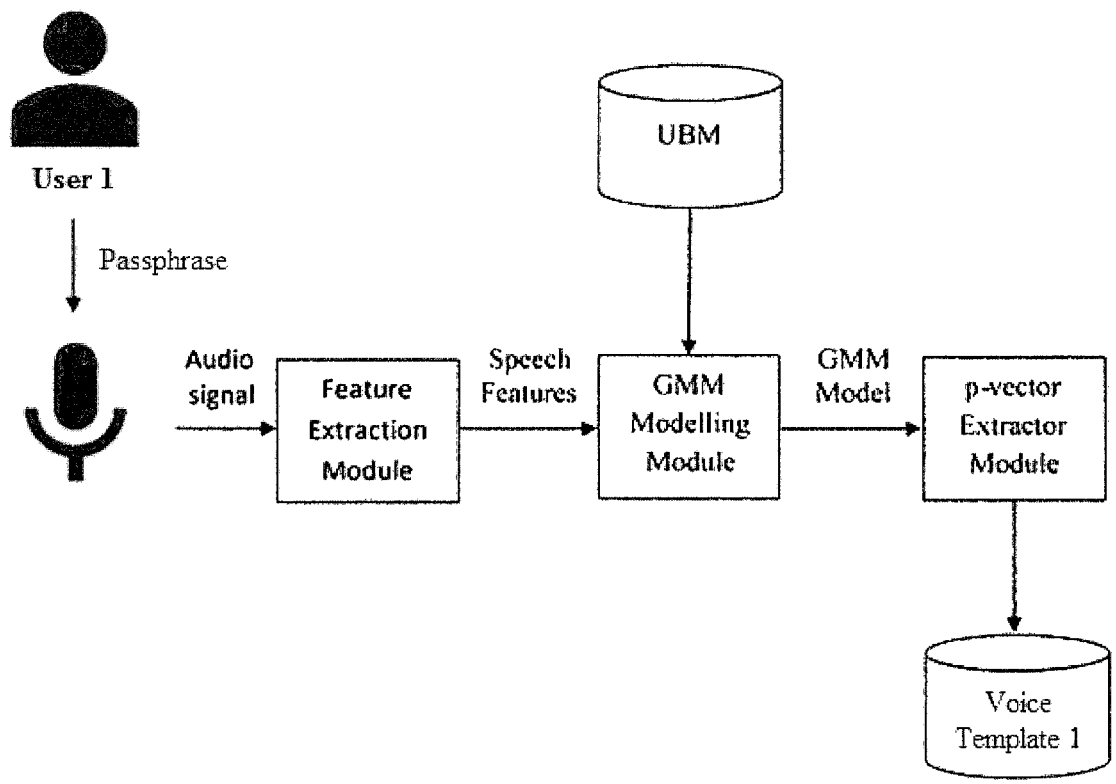
FIG. 1A illustrates an example embodiment of a system for enrollment stage.
Figure 1B:
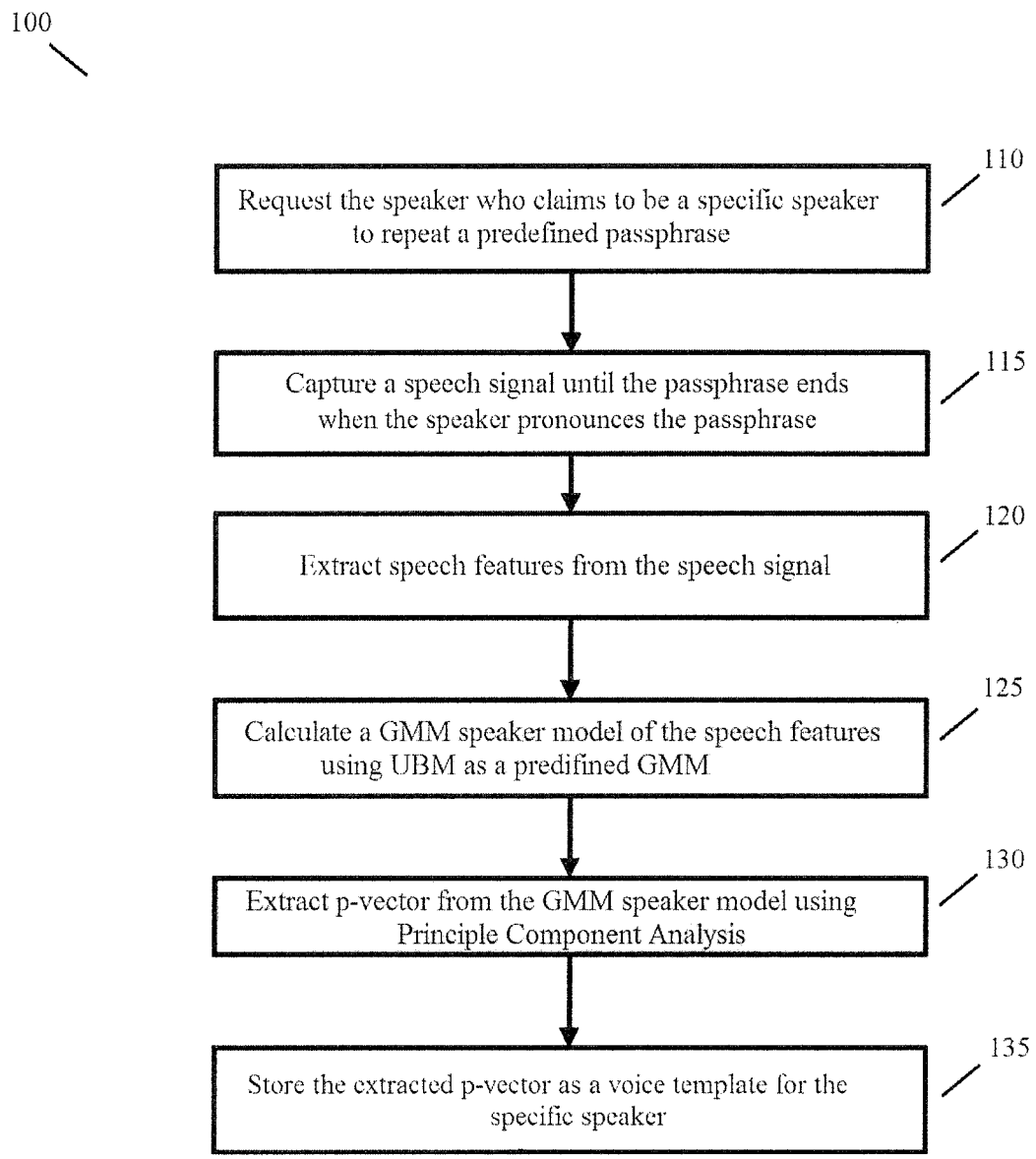
FIG. 1B shows a flow diagram of an example method on an enrollment stage.

Referring to FIGS. 1A and 1B, a system for enrollment process and a flow diagram of an enrollment process are illustrated.

In general, an enrollment process is a process of creation of a voice template for a specific speaker in a voice biometric system, i.e. an initial process of collecting data relating to the specific speaker, processing the collected data and storing the processed data in a computing device's memory for further speaker verification. In case of the present invention, the enrollment process is part of the proposed computer-implemented method for verifying identity of a speaker.

In a computer-implemented method for verifying identity of a speaker according to the present invention, the enrollment process is a process of obtaining a low dimensional p-vector for a specific speaker and storing it for comparison with p-vector of a speaker who claims to be a specific speaker.

In a computer-implemented method for determining identity of a speaker according to the present invention, identity of a speaker is determined from multiple low dimensional p-vectors of different specific speakers stored in a database which requires the same enrollment process, but for multiple speakers. For this case, the enrollment process will be carried out multiple times, i.e. each specific speaker should enroll at least once so that his or her p-vector will be stored in a database in a way where one p-vector correlates to one specific speaker. These stored p-vectors, will then be compared with a p-vector obtained for a speaker to be identified when the computer-implemented method for determining identity of a speaker is used.

Even though the enrollment process is described here as a separate process, it should be noted that the same steps, except storing p-vector(s) for specific speaker(s) for future comparison(s), are performed during speaker verification or identification without steps of comparing a stored reference p-vector previously obtained for the specific speaker and the extracted p-vector using a matching algorithm to determine a resulting biometric score, and verifying/determining identity of the speaker on the basis of said resulting biometric score(s).

A system for recognizing identity of a speaker according to the present invention comprises a user interface; a microphone configured to capture a speech signal from a speaker; a software programmable CPU; a memory unit configured to store at least one vector; a feature extraction module for extracting speech features from the speech signal; a GMM modelling module for calculating a high dimensional Gaussian Mixture Model (GMM) speaker model of the speech features using a Universal Background Model (UBM) as a predefined GMM; a p-vector extraction module for extracting a low dimensional vector from the GMM speaker model; and a p-vector matching module for comparing at least one reference p-vector relating to a specific speaker and the extracted p-vector.

The user interface (UI) allows a speaker or a person who needs to verify or identify the speaker, or a computer program/smartphone application/web service/etc. which is requested to verify or identify the speaker, to initiate the method according to the present invention. The UI is software programmable and can be of any type. For example, the UI can be configured to allow the speaker, which can be generally called a user before pronouncing a phrase, to press a key before saying a predefined passphrase to initiate collecting audio from the user.

In some embodiments, the UI can also be configured to output the predefined phrase in form of a text. The UI can also be configured to request the speaker to pronounce any relevant information about him or her, such as speaker's login, so as to allow the speaker to claim his or her identity before verification. Requesting any relevant information about the speaker is necessary only for verifying identity of a speaker, since in accordance with that relevant information the system chooses a corresponding p-vector, previously obtained for that specific speaker.

Determining identity of a speaker can be performed without any relevant information about the speaker since the extracted p-vector will be compared with all the p-vectors stored in a database. In this case, all these p-vectors correspond to all specific speakers, i.e. each specific speaker has his or her own corresponding p-vector. The used microphone is configured to capture a speech signal from a speaker and can be of any type, e.g. a smartphone microphone, a dictaphone (voice recorder), a Personal Computer (PC) microphone, etc. Also, any type of communication channels can be used for extracting speech features. Including, but not limited to, cellular (GSM/CDMA), IP telephone, landline, internet/web channels, etc. Landline and cellular (GSM/CDMA) channels can utilize a voice codec at a 300-3400 Hz or more with a sampling frequency of 8 KHz or more. The software programmable CPU can be of any type, e.g. x86 or x64 architecture, ARM based architectures, single core, dual core or any other number of cores. The memory unit can be any Read Only Memory (ROM) non-volatile memory like Programmable read-only memory (PROM), Erasable Programmable read only memory (EPROM), or Electrically erasable programmable read only memory (EEPROM). In some embodiments, a memory unit can further be a database, a server database, a cloud database, etc.

(Feature Extraction Module)

Feature Extraction Module is used to extract speech features from the speech signal.

In one embodiment of the present invention, a user pronounces a passphrase in order to initiate the system. A microphone continuously captures an audio containing the passphrase when the speaker pronounces the passphrase until the passphrase ends. Then, the following steps are executed by the Feature Extraction Module with a goal of speech feature extraction:

1. Separating an audio into short audio frames with overlapping;

2. Calculating a single speech feature vector for each audio frame.

Speech features can be obtained by performing at least one of the following methods: Mel Frequency Cepstral Coefficients (MFCC), Linear Frequency Cepstral Coefficients (LFCC), Perceptual Linear Prediction (PLP), Linear Predictive Codes (LPC), extraction of bottleneck features using the predefined Deep Neural Network. At this stage, a channel compensation can take place depending on the chosen method.

In an implemented working smartphone application utilizing the method for verifying identity of a speaker according to the present invention, the MFCC method was utilized, with a feature dimensionality of 39. However, any other above methods for obtaining speech features, and any other number of feature dimensions can be chosen.

(GMM Modeling Module)

GMM Modelling Module provides a Maximum a Posteriori (MAP) adaptation of a predefined GMM named Universal Background Model (UBM) into a Gaussian Mixture Model (GMM) as a speaker model using a set of speech feature vectors as an input. It should be noted that any known trained GMM can be chosen as UBM. In the implemented working smartphone application utilizing the method for verifying identity of a speaker according to the present invention, dimensionality of the GMM model was chosen as 512 Gaussians. It should be noted that any appropriate number of Gaussians can be chosen as dimensionality of the GMM model. For example, in one embodiment, 256 Gaussians were chosen as dimensionality of the GMM model. In another embodiment, 1024 Gaussians were chosen as dimensionality of the GMM model. GMM speaker model is estimated using adaptation of mean vectors of the UBM:

$$\mu_m^{(new)} = (1 - \alpha_m)\mu_m^{(old)} + \alpha_m \frac{F_m}{N_m},$$

where $\mu_m^{(new)}$ is an adapted mean Gaussian supervector, $\mu_m^{(old)}$ is a prior knowledge represented with mean vectors of the UBM, $$\frac{F_m}{N_m}$$

is an expected mean feature vector for adaptation data, and $\alpha_m$ is an adaptation speed that controls balance between the new data and prior knowledge.

The adaptation speed is defined by the following value:

$$\alpha_m = \frac{N_m}{N_m + \tau},$$

where $\tau$ is a relevant constant.

Posteriors 0th and 1st order statistics for m-th component are defined as follows:

$$\gamma_m^{(t)} = \frac{\pi_m \cdot N_m(D^{(t)} | \theta_m)}{\sum_k^M \pi_k \cdot N_k(D^{(t)} | \theta_k)}$$

$$N_m = \sum_t^T \gamma_m^{(t)},$$

$$F_m = \sum_t^T \gamma_m^{(t)} \cdot D^{(t)}$$

As a result, a GMM supervector is obtained, which consists of stacked MAP-adapted mean vectors, UBM covariance matrices and UBM mixture weights. Additional normalization technique of the GMM supervector can be implemented using division of the supervector by the UBM covariance matrices and multiplication of the result of the division by the UBM mixture weights. Some embodiments can include Deep Neural Network implementation for statistics calculation.

(p-Vector Extraction Module)

Since the obtained GMM model is always high-dimensional (up to 100,000 units or even more), it needs to be reduced to a calculable dimension containing all the necessary features. The p-vector Extraction Module uses GMM model as an input and produces a single vector called "p-vector", or "principal vector".

The algorithm is as follows:

1. GMM mean vectors are stacked into a single supervector.

2. Additional supervector normalization can be applied using division of the supervector by GMM covariances and multiplication of the result of the division by GMM component weights.

3. Principal Component Analysis (PCA) approach is then applied to the supervector with a goal to obtain a reduced p-vector.

The p-vector Extraction Module is an important part of the present invention. State-of-the-art speaker recognition systems operate with a low dimensional i-vector extracted using a GMM modelling. However, there are 2 major differences between the i-vector and p-vector extraction:

1. i-vector approach operates with Factor Analysis, while p-vector uses PCA approach.

2. i-vector dimension typically does not exceed 400-800 while p-vector dimension suggested to use is 2500-10000. In the implemented working smartphone application utilizing the method for verifying identity of a speaker according to the present invention, dimensionality of the p-vector was chosen at 10000 units.

These differences result in the following p-vector approach advantages:

1. p-vector extracts much faster comparing to i-vector;

2. p-vector contains more speaker-related information comparing to i-vector due to its high dimension.

This results in higher speaker recognition accuracy for short passphrases.

The extracted p-vector for a specific speaker is then be stored in a database. At this stage, the enrollment process ends, however, it can have as many iterations based on the amount of users of the system. One particular user (or speaker) is required to have his or her own particular p-vector extracted from his or her speech.

In FIG. 1B, the enrollment process is described as a method 100 for obtaining a p-vector corresponding to a specific speaker. The method steps are as follows: requesting 110 a speaker who claims to be a specific speaker to repeat a predefined passphrase; continuously capturing 115 a speech signal until the passphrase ends when the speaker pronounces the passphrase; extracting 120 speech features from the speech signal; calculating 125 a high dimensional Gaussian Mixture Model (GMM) speaker model of the speech features using a Universal Background Model (UBM) as a predefined GMM; extracting 130 a low dimensional p-vector from the GMM speaker model; and storing 135 the extracted p-vector as a voice template for the specific speaker.

Figure 2:
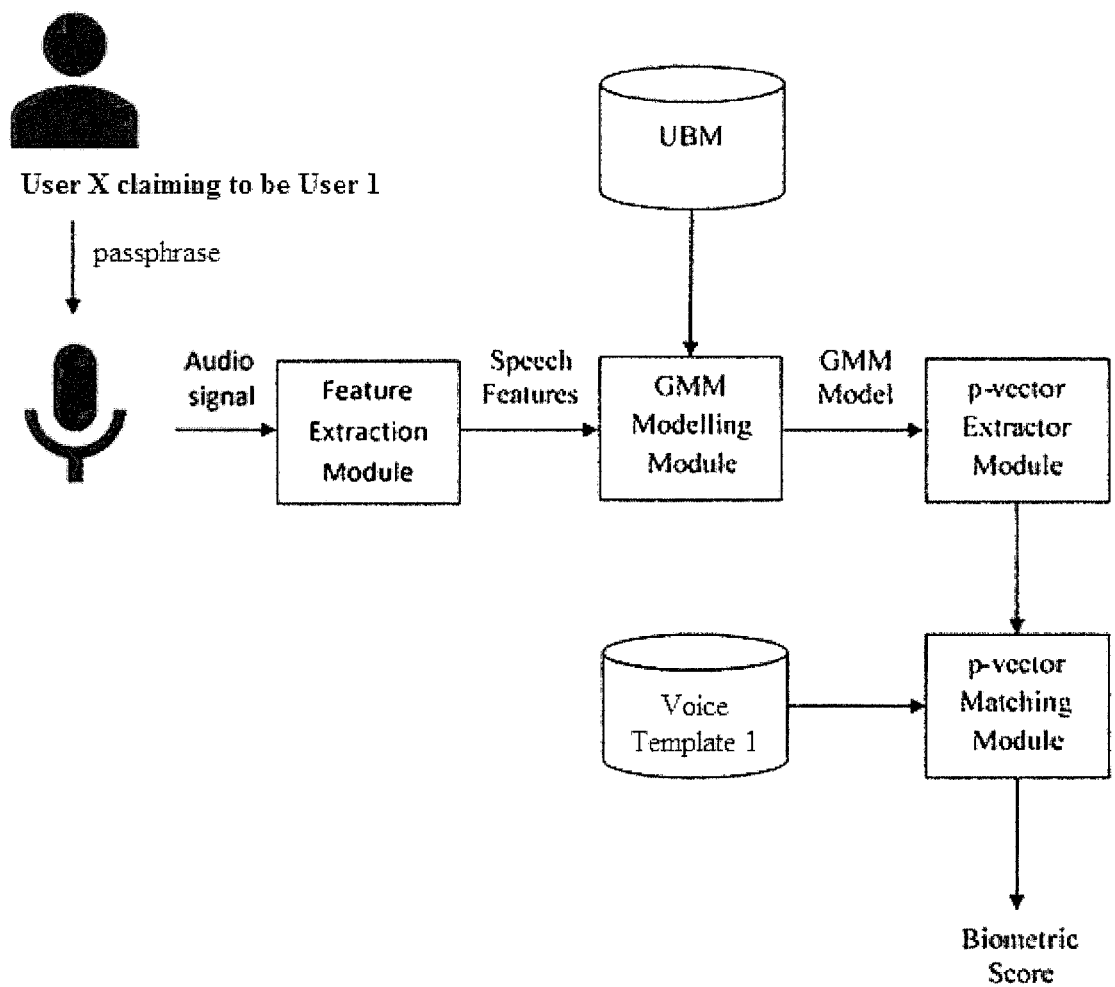
FIG. 2 illustrates an example embodiment of a system for recognizing identity of a speaker, which is configured to implement an example method for verifying identity of a speaker.

Now referring to FIG. 2, an example embodiment of a system for recognizing identity of a speaker is shown, which system is configured to implement the method for verifying identity of a speaker.

The computer-implemented method for verifying identity of a speaker comprises the same steps as those required for obtaining a p-vector corresponding to a specific speaker at the enrollment stage. However, here the extracted p-vector is not stored in a database, but sent directly to the p-vector Matching Module to be compared with a voice template.

(p-Vector Matching Module)

The p-vector Matching Module compares a stored reference p-vector (generally called a voice template) previously obtained for a specific user and the extracted p-vector using one of the following algorithms: Probabilistic Linear Discriminant Analysis (PLDA), Linear Discriminant Analysis (LDA), cosine similarity. As a result, a resulting biometric score is obtained. The system may further comprise an authentication module configured to make an authentication decision. The authentication module is configured to compare the total biometric score with a predetermined threshold. The authentication decision can be then sent to a requested software, operational system, website, computer, server, etc. to grant access to the particular user. In case of using PLDA method, the resulting biometric score can be from −∞ to +∞, and the speaker will be authenticated if only the resulting score is a positive value, i.e. more than zero. Other embodiments may require a threshold value for authentication decision. In some embodiments, for example in embodiments that are human-operated, an operator can determine to authenticate a speaker based on his or her resulting biometric score, i.e. there would be no need in authentication module.

Figure 3:
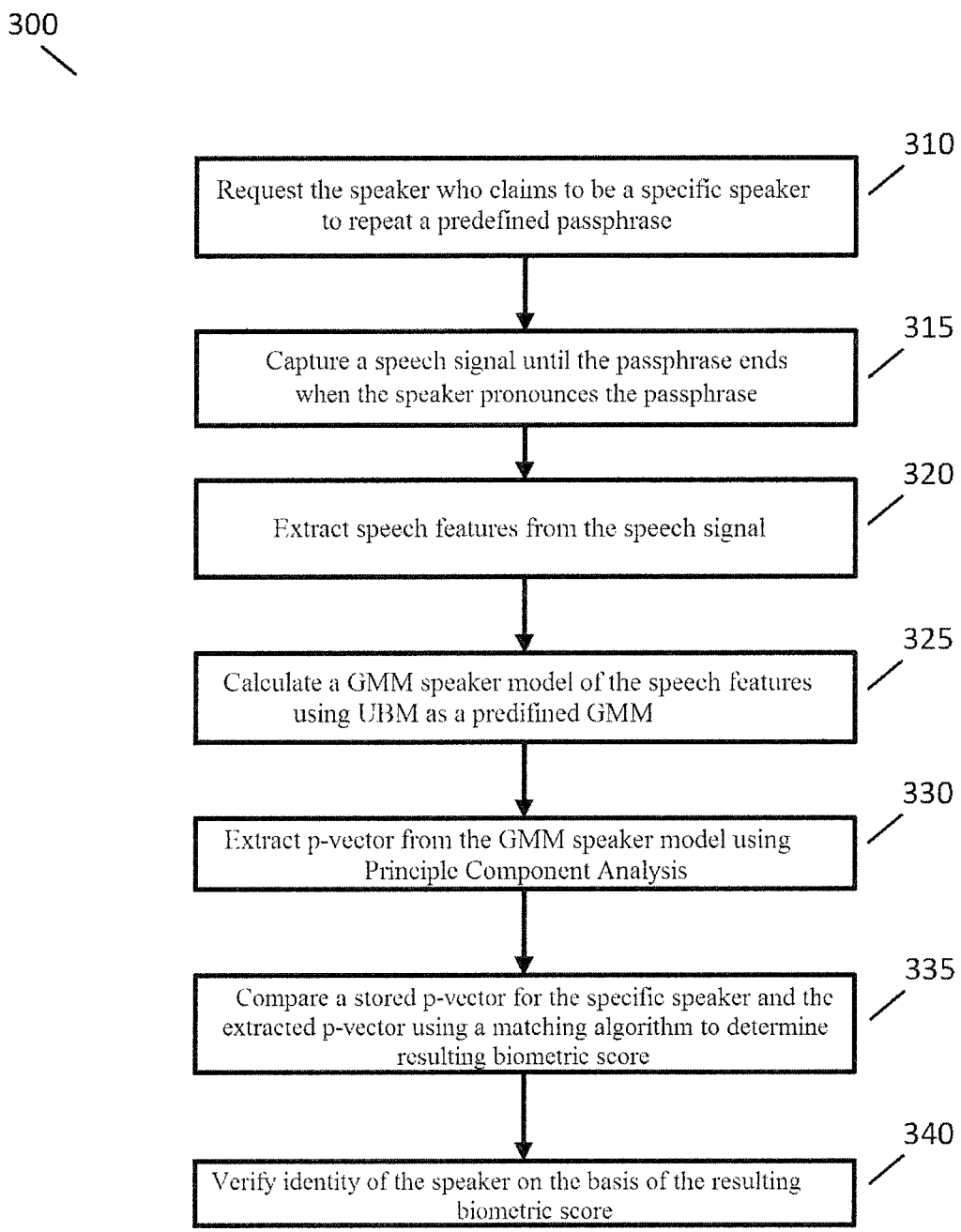
FIG. 3 shows a flow diagram of an example method for verifying identity of a speaker.

FIG. 3 shows steps of an example computer-implemented method 300 for verifying identity of a speaker. As it was noted above, identity verification of a speaker requires an additional information from the speaker, i.e. the speaker should anyhow claim to be a specific speaker, for example by typing in his or her login in case the method is used on a smartphone, a computer or a web-service. In one embodiment, for example in banking services, or when a user calles to a call-center, the user can pronounce his or her full name and/or address. This will allow an automated system or a person operating such system to pick the p-vector corresponding to this person (generally called "voice template") from a database, which p-vector was previously obtained when this person participated in the enrollment process, for example when he or she visited the bank for the first time or registered in a web-service, phone application, computer program, or the like.

The computer-implemented method 300 for verifying identity of a speaker comprises requesting 310 a speaker who claims to be a specific speaker to repeat a predefined passphrase. The predefined passphrase can be of any duration, for example 1-3 seconds. The predefined passphrase used to identify or to verify a claimed identity of an individual, for example, can be "An oak is a tree. A rose is a flower", which approximately takes 2-3 seconds to pronounce. However, the used phrase can be shorter, e.g. "An oak is a tree" (appr. 1-2 seconds), or it can be longer than 3 seconds. In some embodiments, it can be shorter than 1 second (e.g. "An oak", "Hello World", or a name of an individual).

The request can be performed by the system, for example as a pop-up window in case of web-service, a new window or animation in case of phone application or computer program or any combination of the like. The request can be performed by a person operating the system if the system is utilized in a bank or a call-center or the like. The computer-implemented method 300 for verifying identity of a speaker also comprises continuously capturing 315 a speech signal until the passphrase ends (i.e. when the speaker pronounces the passphrase) and extracting 320 speech features from the speech signal. The steps of capturing 315 a speech signal until the passphrase ends and extracting 320 speech features from the speech signal are performed by the Feature Extraction Module.

However, in some embodiments, the step of capturing 315 a speech signal until the passphrase ends can be performed by any other module configured to capture a speech signal and comprising software and hardware means. The software means can be of any suitable type of programming-language code generated to cause the hardware means such as microphone to capture a speech signal. The feature extraction module separates said speech signal on the form of audio into short audio frames with overlapping and calculates a single speech feature vector for each audio frame. It can further be programmed to stop capturing speech signal when the predetermined maximum duration time of a passphrase is over.

In case the system is operated by a human, for example in a bank, this person operating the system may choose when to stop capturing the audio signal, for example by letting go the corresponding key on a keyboard or a button generated by user interface on a screen of a smartphone or tablet. The calculation of single speech feature vectors is performed by using at least one of the following algorithms: Mel Frequency Cepstrum Coefficient (MFCC), Linear Frequency Cepstrum Coefficient (LFCC), Perceptual Linear Prediction (PLP), Linear Predictive Codes (LPC), extraction of bottleneck features using the predefined Deep Neural Network. The computer-implemented method 300 for verifying identity of a speaker also comprises calculating 325 a high dimensional GMM speaker model of the speech features using a UBM as a predefined GMM. This step is performed by the GMM modelling module, which uses Speech Features as incoming data and transforms them into a Speaker Model by providing a MAP adaptation of the predefined GMM named Universal Background Model (UBM) into a Gaussian Mixture Model (GMM).

The computer-implemented method 300 for verifying identity of a speaker further comprises extracting 330 a low dimensional vector called p-vector from the GMM speaker model by the p-vector Extraction Module. The p-vector extraction is performed by stacking the GMM Model mean vectors into a single supervector; and reducing a dimension of said supervector by performing Principal Component Analysis (PCA). Additional normalization of the supervector using division of the supervector by GMM covariances and multiplication of the result of the division by GMM component weights can be performed before reducing the dimension of the supervector. The computer-implemented method 300 for verifying identity of a speaker further comprises comparing 335 a stored reference p-vector previously obtained using steps 310-330 for the specific speaker with the extracted p-vector using a matching algorithm to determine a resulting biometric score; and verifying 340 identity of the speaker on the basis of the resulting biometric score.

Figure 4:
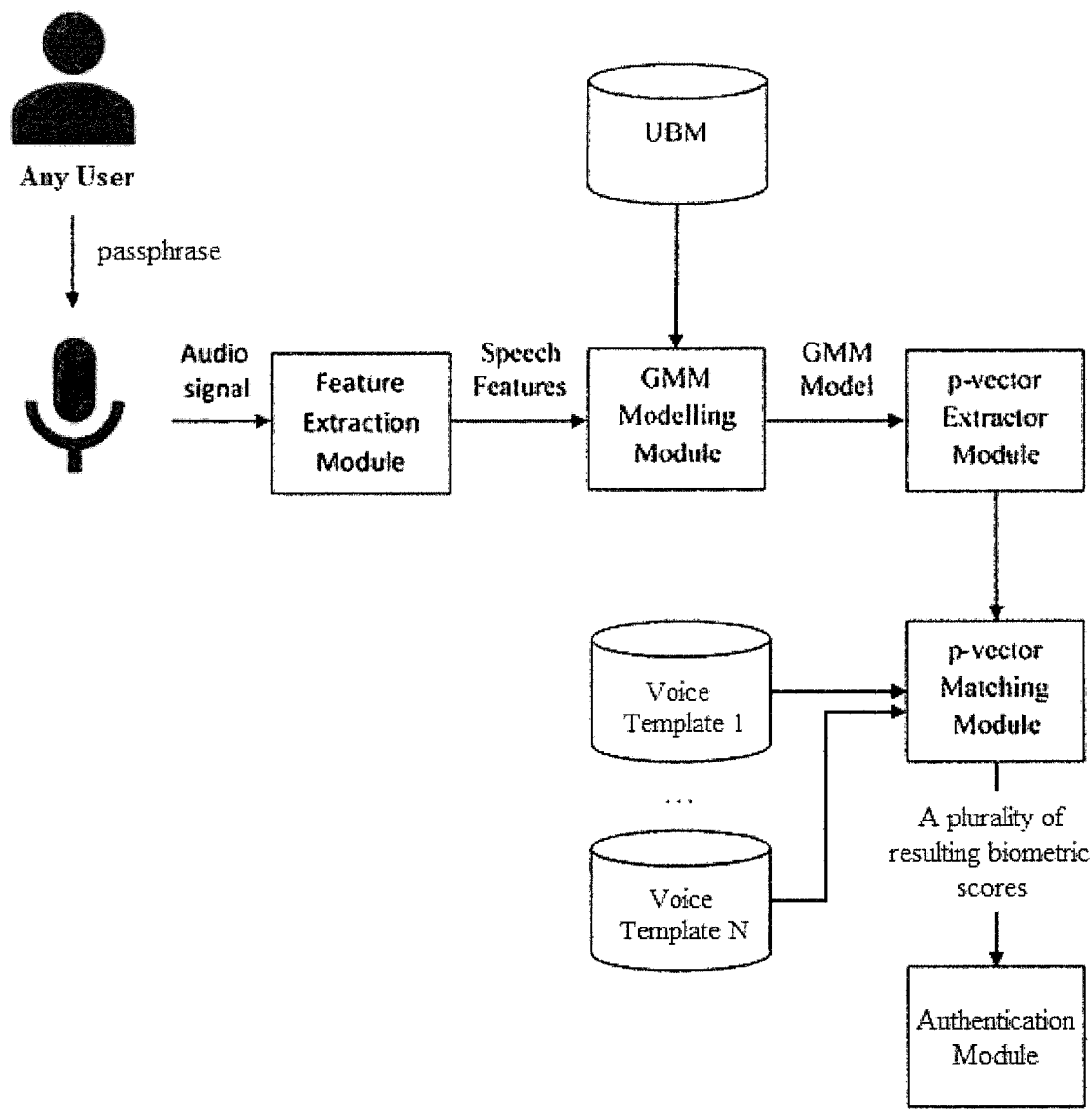
FIG. 4 illustrates an example embodiment of a system for recognizing identity of a speaker, which is configured to implement an example method for determining identity of a speaker.

FIG. 4 shows an example embodiment of a system for recognizing identity of a speaker, which system is configured to implement the method for determining identity of a speaker. The computer-implemented method for determining identity of a speaker comprises the same steps as the ones required for obtaining a p-vector corresponding to a specific speaker at the enrollment stage and is almost identical to the computer-implemented method for verifying identity of a speaker. In this method the extracted p-vector also does not need to be stored in a database, and is sent directly to the p-vector Matching Module. However, the difference from the method for verifying identity of a speaker consists in that no additional information is required from the speaker, i.e. the speaker does not need to claim that he or she is a specific speaker. This further provides a zero effort authentication. However, to utilize this method all of the stored voice templates (or more specifically, p-vectors) for all the enrolled speakers need to be compared with the extracted p-vector of the speaker. All the stored voice templates are voice templates 1 . . . N (i.e. voice template 1, voice template 2, . . . , voice template N) obtained for specific speakers 1 . . . N (i.e. specific speaker 1, specific speaker 2, . . . , specific speaker N) at the enrollment stage. Then, the voice templates 1 . . . N (i.e. the stored p-vectors for the specific speakers) are compared with the extracted p-vector using a matching algorithm, for example PLDA, to determine a plurality of resulting biometric scores. This plurality of resulting biometric scores can be further processed by authorization module to find the most relevant biometric score from the plurality of resulting biometric scores, and, based on this most relevant score to verify identity of a speaker.

Figure 5:
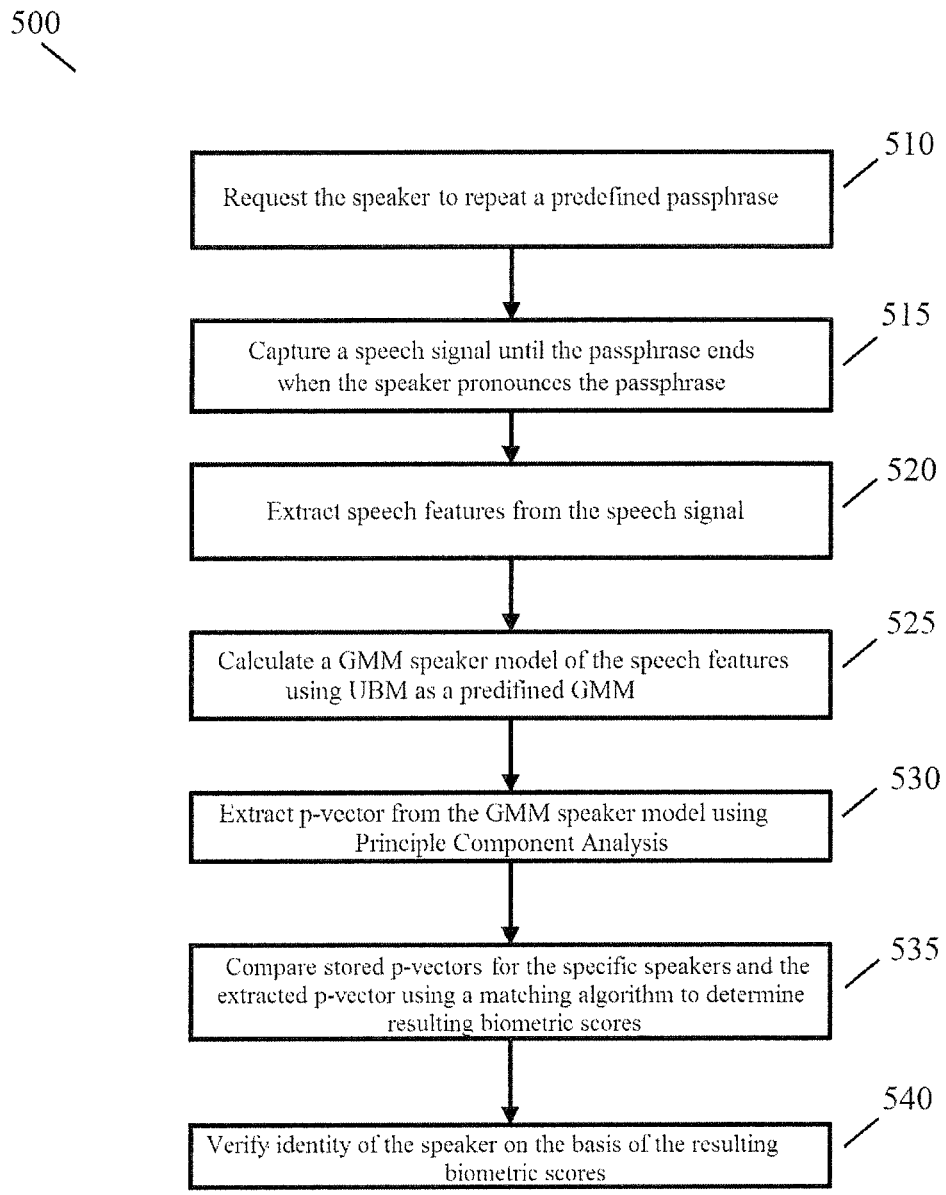
FIG. 5 shows a flow diagram of an example method for recognizing identity of a speaker.

FIG. 5 shows a flow diagram of an example computer-implemented method 500 for determining identity of a speaker. The computer-implemented method for determining identity of a speaker comprises requesting 510 the speaker to repeat a predefined passphrase; continuously 515 capturing a speech signal until the passphrase ends; extracting 520 speech features from the speech signal; calculating 525 a high dimensional Gaussian Mixture Model (GMM) speaker model of said speech features using a Universal Background Model (UBM) as a predefined GMM; extracting 530 a low dimensional vector called p-vector from said GMM speaker model; comparing 535 a plurality of stored reference p-vectors previously obtained using steps 510-535 for different specific speakers and the extracted p-vector using a matching algorithm to determine a plurality of resulting biometric scores; determining 540 identity of the speaker on the basis of the plurality of resulting biometric scores.

It will be apparent to those skilled in the art that described herein are novel systems and methods for text-dependent speaker recognition. While the invention was described with reference to specific preferred embodiments, it is not limited to these embodiments. The invention may be modified or varied in many ways and such modifications and variations as would be obvious to those skilled in the art are within the scope and spirit of the invention and are included within the scope of the following claims.

What is claimed is:

1. A computer-implemented method (300) for verifying identity of a speaker, comprising:
    requesting (310) the speaker who claims to be a specific speaker to repeat a predefined passphrase;
    capturing (315) a speech signal when the speaker repeats the predefined passphrase;
    extracting (320) speech features from the speech signal;
    calculating (325) a high dimensional Gaussian Mixture Model (GMM) speaker model of the speech features using a Universal Background Model (UBM) as a predefined GMM;
    extracting (330) a low dimensional vector called p-vector from the GMM speaker model;
    comparing (335) a stored reference p-vector previously obtained using steps (310)-(330) for the specific speaker with the extracted p-vector using a matching algorithm to determine a resulting biometric score; and
    verifying (340) identity of the speaker on a basis of the resulting biometric score.

2. The computer-implemented method for verifying identity of a speaker as claimed in claim 1, wherein the extraction of said speech features comprises separating said speech signal into short audio frames with overlapping and calculating a single speech feature vector for every audio frame.

3. The computer-implemented method for verifying identity of a speaker as claimed in claim 2, wherein the calculation of single speech feature vectors is performed by using at least one of the following algorithms: Mel Frequency Cepstrum Coefficient (MFCC), Linear Frequency Cepstrum Coefficient (LFCC), Perceptual Linear Prediction (PLP), Linear Predictive Codes (LPC), extraction of bottleneck features using a predefined Deep Neural Network.

4. The computer-implemented method for verifying identity of a speaker as claimed in claim 2, wherein said GMM speaker model is estimated using a Maximum a Posteriori (MAP) adaptation of mean vectors the UBM using a plurality of single speech feature vectors as input.

5. The computer-implemented method for verifying identity of a speaker as claimed in claim 1, wherein the extraction of the p-vector is performed by:
    stacking mean vectors of the GMM speaker Model into a single supervector; and
    reducing a dimension of the single supervector by performing Principal Component Analysis (PCA).

6. The computer-implemented method for verifying identity of a speaker as claimed in claim 1, wherein the extraction of the p-vector is performed by
    stacking mean vectors of the GMM speaker Model into a single supervector;
    normalizing said single supervector based on division of said single supervector by GMM covariances and multiplication a result of the division by GMM component weights; and
    reducing a dimension of said single supervector by performing a Principal Component Analysis (PCA).

7. The computer-implemented method for verifying identity of a speaker claimed in claim 1, wherein said matching algorithm for comparison of the stored reference p-vector previously obtained for the specific speaker and a generated p-vector is performed by using at least one of the following algorithms: Probabilistic Linear Discriminant Analysis (PLDA), Linear Discriminant Analysis (LDA), Cosine Similarity.

8. A computer-implemented method (500) for determining identity of a speaker, comprising:
    requesting (510) the speaker to repeat a predefined passphrase;
    continuously (515) capturing a speech signal when the speaker repeats the predefined passphrase;
    extracting (520) speech features from the speech signal;

calculating (525) a high dimensional Gaussian Mixture Model (GMM) speaker model of said speech features using a Universal Background Model (UBM) as a predefined GMM;

extracting (530) a low dimensional vector called p-vector from said GMM speaker model;

comparing (535) a plurality of stored reference p-vectors previously obtained using steps (510)-(535) for different specific speakers and the extracted p-vector using a matching algorithm to determine a plurality of resulting biometric scores;

determining (540) identity of the speaker on a basis of the plurality of resulting biometric scores.

9. The computer-implemented method for determining identity of a speaker as claimed in claim 8, wherein the extraction of said speech features comprises separating said speech signal into short audio frames with overlapping and calculating a single speech feature vector for every audio frame.

10. The computer-implemented method for determining identity of a speaker as claimed in claim 9, wherein the calculation of single speech feature vectors is performed by using at least one of the following algorithms: Mel Frequency Cepstrum Coefficient (MFCC), Linear Frequency Cepstrum Coefficient (LFCC), Perceptual Linear Prediction (PLP), Linear Predictive Codes (LPC), extraction of bottleneck features using a predefined Deep Neural Network.

11. The computer-implemented method for determining identity of a speaker as claimed in claim 9, wherein said GMM speaker model is estimated using a Maximum a Posteriori (MAP) adaptation of mean vectors of the UBM using a plurality of single speech feature vectors as input.

12. The computer-implemented method for determining identity of a speaker as claimed in claim 8, wherein the extraction of the p-vector is performed by:
stacking mean vectors of the GMM speaker model into a single supervector;
normalizing said single supervector based on division of said single supervector by GMM covariances and multiplication a result of the division by GMM component weights; and
reducing a dimension of said single supervector by performing Principal Component Analysis (PCA).

13. The computer-implemented method for determining identity of a speaker claimed in claim 8, wherein the matching algorithm for comparison of a stored reference p-vector previously obtained for a specific speaker and a generated p-vector is performed by using at least one of the following algorithm: Probabilistic Linear Discriminant Analysis (PLDA), Linear Discriminant Analysis (LDA), Cosine Similarity.

14. A system for recognizing identity of a speaker, comprising
a user interface (UI);
a microphone configured to capture a speech signal from a speaker;
a software programmable CPU;
a memory unit configured to store at least one p-vector;
a feature extraction module for extracting speech features from the speech signal;
a GMM modelling module for calculating a high dimensional Gaussian Mixture Model (GMM) speaker model of the speech features using a Universal Background Model (UBM) as a predefined GMM;
a p-vector extraction module for extracting a low dimensional vector called p-vector from the GMM speaker model; and
a p-vector matching module for comparing at least one stored reference p-vector relating to a specific speaker and the extracted p-vector with a matching algorithm.

15. The system as claimed in claim 14, wherein the feature extraction module separates said speech signal into short audio frames with overlapping and calculates a single speech feature vector for every audio frame.

16. The system as claimed in claim 15, wherein the feature extraction module calculates single speech feature vectors by using one of the following algorithms: Mel Frequency Cepstrum Coefficient (MFCC), Linear Frequency Cepstrum Coefficient (LFCC), Perceptual Linear Prediction (PLP), Linear Predictive Codes (LPC), extraction of bottleneck features using a predefined Deep Neural Network.

17. The system as claimed in claim 14, wherein the GMM modelling module estimates the GMM speaker model using a maximum a posteriori (MAP) adaptation of mean vectors of the UBM using a plurality of single speech feature vectors as input.

18. The system as claimed in claim 14, wherein the p-vector extraction module stacks mean vectors of the GMM Model into a single supervector and reduces a dimension of the supervector by performing a Principal Component Analysis (PCA).

19. The system as claimed in claim 14 wherein the p-vector extraction module stacks mean vectors of the GMM Model into a single supervector, normalizes the single supervector based on division of said single supervector by GMM covariances and multiplication a result of the division by GMM component weights; and
reduces a dimension of the single supervector by performing a Principal Component Analysis (PCA).

20. The system as claimed in claim 14, wherein the matching algorithm is at least one of the following: Probabilistic Linear Discriminant Analysis (PLDA), Linear Discriminant Analysis (LDA), Cosine Similarity.

* * * * *